US012777203B2

(12) United States Patent
Hsu et al.

(10) Patent No.: US 12,777,203 B2
(45) **Date of Patent: *Oct. 27, 2026**

(54) METHOD AND SERVER FOR HANDLING STREAMING DATA

(71) Applicant: 17LIVE Japan Inc., Tokyo (JP)

(72) Inventors: YungChi Hsu, Taipei City (TW); Ming-Che Cheng, Taipei City (TW); Shao Yuan Wu, Taipei City (TW)

(73) Assignee: 17LIVE Japan Inc., Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 19/030,298

(22) Filed: Jan. 17, 2025

(65) Prior Publication Data

US 2025/0168415 A1 May 22, 2025

Related U.S. Application Data

(63) Continuation of application No. 17/972,983, filed on Oct. 25, 2022, now Pat. No. 12,231,700.

(30) Foreign Application Priority Data

Feb. 25, 2022 (JP) ................................ 2022-028682
May 18, 2022 (JP) ................................ 2022-081338

(51) Int. Cl.
*H04N 21/2187* (2011.01)
*H04N 21/4788* (2011.01)
*H04N 21/488* (2011.01)

(52) U.S. Cl.
CPC ..... *H04N 21/2187* (2013.01); *H04N 21/4788* (2013.01); *H04N 21/4882* (2013.01)

(58) Field of Classification Search
CPC .......... H04N 21/2187; H04N 21/4788; H04N 21/4882

(Continued)

(56) References Cited

U.S. PATENT DOCUMENTS 11,936,922 B2 * 3/2024 Tian ................ H04N 21/25875
2013/0205400 A1 * 8/2013 Yerli .................... G06F 21/604 726/26
2021/0127171 A1 * 4/2021 Liu ...................... G06F 3/0488

FOREIGN PATENT DOCUMENTS

CN 1992618 A * 7/2007
CN 109640102 A * 4/2019 ....... H04N 21/47205

(Continued)

OTHER PUBLICATIONS

Notice of Reasons for Refusal dated Aug. 9, 2022, issued in corresponding Japanese Patent Application No. 2022-081338, with English translation (9 pgs.).

*Primary Examiner* — Liang Che A Wang

(74) *Attorney, Agent, or Firm* — HDLS IPR SERVICES; Chun-Ming Shih

(57) ABSTRACT

The subject application relates to a method and server for handling streaming data, and includes: Obtaining a request for entering the live streaming as an invisible viewer; in response to obtaining the request, starting to provide a first user terminal of a first viewer with the streaming data for the live streaming while setting information on the first viewer invisible to other viewers and a streamer; and in response to detecting a first action of the first viewer in the live streaming, setting at least a part of the information visible to at least a part of the other viewers and the streamer. According to the subject application, it is possible to encourage further communication between the streamer and the viewer, and enhance user-user interactions through the live streaming.

18 Claims, 13 Drawing Sheets

(58) Field of Classification Search
USPC ................................ 709/204, 205, 206, 231
See application file for complete search history.

(56) References Cited

FOREIGN PATENT DOCUMENTS

| | | | | | |
|---|---|---|---|---|---|
| CN | 111510780 | A | * | 8/2020 | ............. H04N 21/44 |
| CN | 109640102 | B | | 5/2021 | |
| CN | 115426531 | A | * | 12/2022 | ............. H04L 51/10 |
| JP | 2019036847 | A | | 3/2019 | |
| JP | 2022055800 | A | | 4/2022 | |
| WO | WO-2015035934 | A1 | * | 3/2015 | ......... H04L 12/1818 |

* cited by examiner

| Stream ID | Streamer ID | Visible viewer ID | Invisible viewer ID |
|---|---|---|---|
| 001abc | XYZ | ABC, CDE, DEF | ZZZ |
| ... | ... | ... | ... |

FIG. 4

METHOD AND SERVER FOR HANDLING STREAMING DATA

CROSS-REFERENCE TO RELATED APPLICATIONS

This application a Continuation Application of U.S. Ser. No. 17/972,983 filed on Oct. 25, 2022, which is based on and claims the benefit of priority from Japanese Patent Application Serial No. 2022-081338 (filed on May 18, 2022) which is based on and claims the benefit of priority from Japanese Patent Application Serial No. 2022-028682 (filed on Feb. 25, 2022), the contents of which are hereby incorporated by reference in its entirety.

TECHNICAL FIELD

This disclosure relates to information and communication technology, and in particular, to an invisible mode in a live streaming room.

BACKGROUND

With vigorous development of the Internet and mobile networks, electronic products (such as a mobile phone, a tablet computer, a desktop computer, a notebook, and a smart appliance) having a network access function have been widely used by the public. In addition, information is massive on networks and can be conveniently obtained.

In order to interact with others in real-time, some APPs or platforms provide live streaming services for the streamers and viewers. For some viewers, they would like to watch the live streaming without interaction and being noticed.

Therefore, some APPs or platforms also provide the feature of invisible mode to let the viewers enjoy the live streaming without being disturbed (For example, Patent Document 1 as below).

[Patent Document 1]: CN109640102B

However, these kinds of viewers tend not to interact or donate, so limited profits would be contributed to the streamers and the platforms. Therefore, there is a demand for the improvement of communication and interactions among the invisible viewer, streamers and other viewers.

SUMMARY

An embodiment of subject application relates to a method for handling streaming data for a live streaming, and comprising: obtaining a request for entering the live streaming as an invisible viewer; in response to obtaining the request, starting to provide a first user terminal of a first viewer with the streaming data for the live streaming while setting information on the first viewer invisible to other viewers and a streamer; and in response to detecting a first action of the first viewer in the live streaming, setting at least a part of the information visible to at least a part of the other viewers and the streamer.

Another embodiment of subject application relates to a server for handling streaming data for a live streaming, and comprising: obtaining a request for entering the live streaming as an invisible viewer; in response to obtaining the request, starting to provide a first user terminal of a first viewer with the streaming data for the live streaming while setting information on the first viewer invisible to other viewers and a streamer; and in response to detecting a first action of the first viewer in the live streaming, setting at least a part of the information visible to at least a part of the other viewers and the streamer.

It is to be noted that any arbitrary combination of the above-described structural components or rearrangement of the structural components and the expressions of certain embodiments of the disclosure among a device, a method, a system, a computer program, a recording medium having a computer program recorded thereon, and the like are also effective as the embodiments of the disclosure.

According to the present disclosure, it is possible to encourage further communication between the streamer and the viewer, and enhance user-user interactions through the live streaming.

BRIEF DESCRIPTION OF THE DRAWINGS

FIG. 4 shows an exemplary data structure of the stream DB 308 of FIG. 3.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

The live streaming system 1 according to some embodiments of subject application provides enhancement among the users to communicate and interact smoothly. More specifically, it entertains the viewers and streamers in a technical way.

Figure 1:
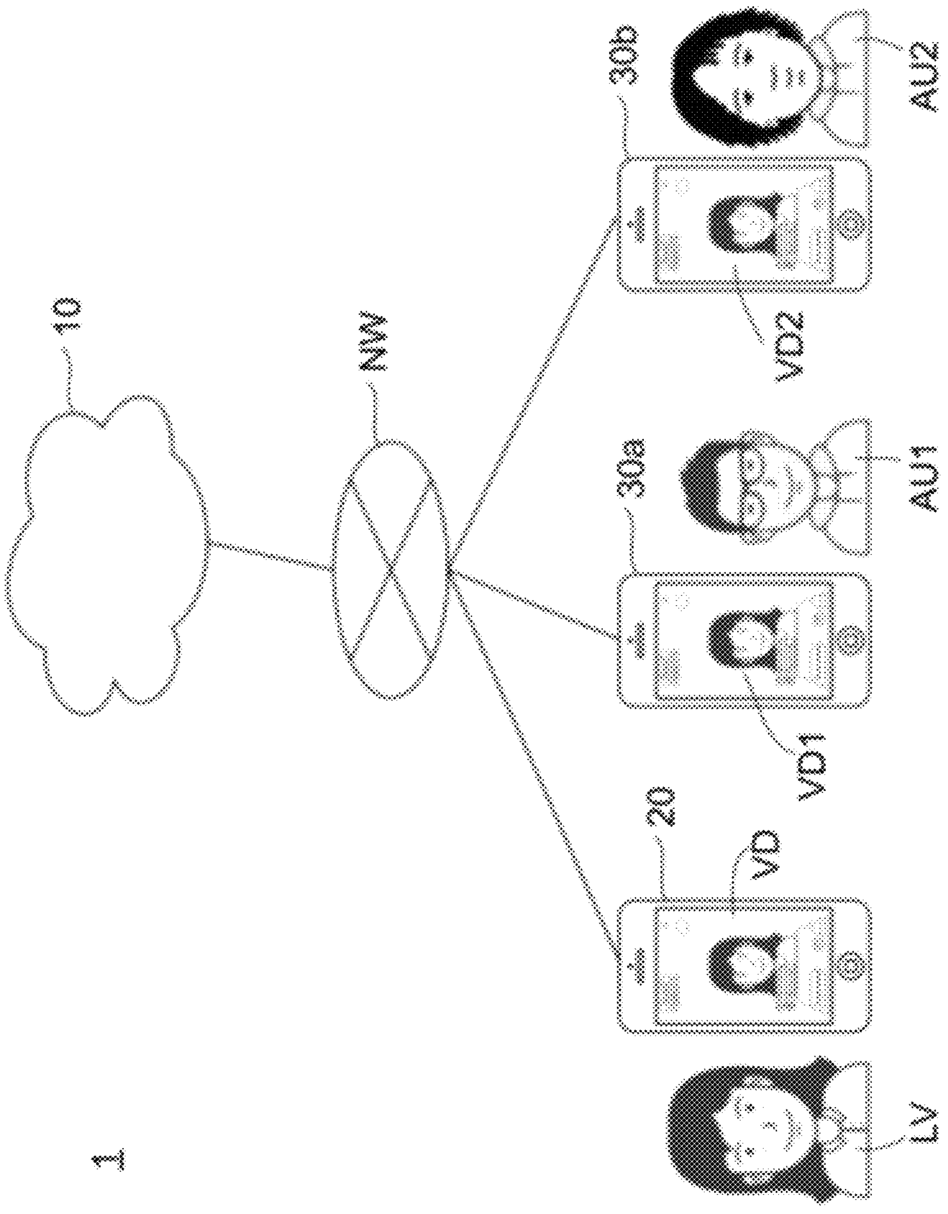
FIG. 1 is a schematic configuration of a live streaming system 1 according to some embodiments of subject application.

FIG. 1 shows a schematic configuration of a live streaming system 1 according to some embodiments of subject application. The live streaming system 1 provides a live streaming service for the streaming distributor (may also be referred as live or streamer) LV and viewer (may also be referred as audience) AU (AU1, AU2 . . . ) to interact mutually in real time. As shown in FIG. 1, the live streaming system 1 may include a server 10, a user terminal 20 and a user terminal 30 (30*a*, 30*b* . . . ). The user terminal 20 may be a streamer and the user terminal 30 may be a viewer. In some embodiments, the streamers and viewers may be referred to as the user. The server 10 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 10, user terminal 20 and user terminal 30 may be communicably connected by any type of wire or wireless network NW.

The live streaming system 1 is involved in the streamer LV, the viewer AU, and APP provider (not shown), who provides the server 10. The streamer LV may record his/her own contents such as songs, talks, performance, game streaming or the like by his/her own user terminal 20 and upload to the server 10, and be the one who distributes contents in real time. In some embodiments, the streamer LV may interact with the viewer AU via the live streaming.

The APP provider may provide a platform for the contents to go on live streaming in the server 10. In some embodiments, the APP provider may be the media or manager to manage the real time communication between the streamer LV and viewer AU. The viewer AU may access the platform by the user terminal 30 to select and watch the contents he/she would like to watch. The viewer AU may perform operations such as commenting or cheering the streamer by the user terminal 30. The streamer, who provides the contents, may respond to the comment or cheer. The response of the streamer may be transmitted to the viewer AU by video and/or audio or the like. Therefore, a mutual communication among the streamer and viewer may be accomplished.

The "live streaming" in this specification may be referred to as the data transmission which enables the contents the streamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format, Web Real-Time Communications, Real-Time Messaging Protocol, MPEG DASH or the like. The live streaming may further include the embodiment that the viewer AU may reproduce or watch the contents with specific delay while the streamer is recording the contents. Regarding the magnitude of the delay, it should be at least small enough to enable the streamer LV and the viewer AU to communicate. However, live streaming is different from socalled on-demand streaming. More specifically, the on-demand streaming may be referred to as storing all data, which records the contents, in the server and then providing the data from the server to the user at random timing according to the user's request.

The "streaming data" in this specification may be referred to as the data includes image data or voice data. More specifically, the image data (may be referred to as video data) may be generated by the image pickup feature of the user terminal 20 and 30. The voice data (may be referred to as audio data) may be generated by the audio input feature of the user terminal 20 and 30. The streaming data may be reproduced by the user terminal 20 30, so that the contents relating to users may be available for watching. In some embodiments, during the period from the streaming data being generated by the user terminal of the streamer to being reproduced by the user terminal of the viewer, the processing of changing format, size or specification of the data, such as compression, extension, encoding, decoding, transcoding or the like, is predictable. Before and after this kind of processing, the contents (such as video and audio) is substantially unchanged, so it is described in the current embodiments of the present disclosure that the streaming data before being processed is the same as that after being processed. In other words, if the streaming data is generated by the user terminal of the streamer and reproduced by the user terminal of the viewer via the server 10, the streaming data generated by the user terminal of the streamer, the streaming data passed through the server 10 and the streaming data received and reproduced by the by the user terminal of the viewer are all the same streaming data.

As shown in FIG. 1, the Streamer LV is providing the live streaming. The user terminal 20 of the streamer generates the streaming data by recording his/her video and/or audio, and transmits to the server 10 via the network NW. At the same time, the user terminal 20 may display the video VD on the display of the user terminal 20 to check the streaming contents of the streamer LV.

The viewer AU1, AU2 of the user terminal 30*a*, 30*b*, who request the platform to provide the live streaming of the streamer, may receive streaming data corresponding to the live streaming via the network NW and reproduce the received streaming data to display the video VD1, VD2 on the display and output the audio from a speaker or the like. The video VD1, VD2 displayed on the user terminal 30*a*, 30*b* respectively may be substantially the same as the video VD recorded by the user terminal of the streamer LV, and the audio outputted from the terminal 30*a*, 30*b* may also be substantially the same as the audio recorded by the user terminal of the streamer LV.

The recording at the user terminal 20 of the streamer may be simultaneous with the reproducing of the streaming data at the user terminal 30*a*, 30*b* of the viewer AU1, AU2. If a viewer AU1 inputs a comment on the contents of the streamer LV into the user terminal 30*a*, the server 10 will display the comment on the user terminal 20 of the streamer in real time, and also display on the user terminal 30*a*, 30*b* of the viewer AU1, AU2 respectively. If the streamer LV responds to the comment, the response may be outputted as the text, image, video or audio from the terminal 30*a*, 30*b* of the viewer AU1, AU2, so that the communication of the streamer LV and viewer LV may be realized. Therefore, the live streaming system may realize the live streaming of two-way communication.

Figure 2:
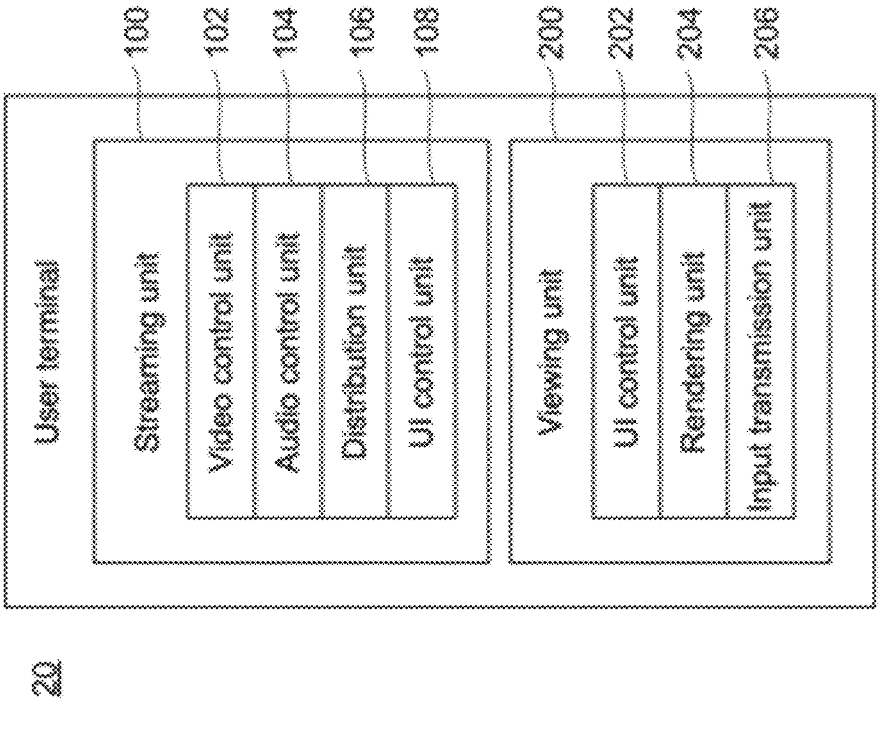
FIG. 2 is a schematic block diagram of the user terminal 20 according to some embodiments of subject application.

FIG. 2 is a block diagram showing a function and configuration of the user terminal 20 in FIG. 1 according to the embodiment of the present disclosure. The user terminal 30 has the similar function and configuration of the user terminal 20. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

The streamer LV and viewer AU may download and install the live streaming application (live streaming APP) of the present disclosure to the user terminal 20 and 30 from the download site via network NW. Or the live streaming APP may be pre-installed in the user terminal 20 and 30. By the execution of the live streaming by the user terminal 20 and 30, the user terminals 20 and 30 may communicate with the server 10 via the network NW to realize a plurality of functions. The functions realized by the execution of the live streaming APP by the user terminal 20 and 30 (More specifically, the processor such as CPU) is described below as the functions of the user terminal 20 and 30. These functions are basically the functions that the live streaming APP makes the user terminals 20 and 30 realize. In some embodiments, these functions may also be realized by transmitting from the server 10 to the web browser of the user terminal 20 and 30 via network NW and be executed by the computer program of the web browser. The computer program may be written in the programming language such as HTML (HyperText Markup Language) or the like.

The user terminal 20 includes streaming unit 100 and viewing unit 200. In some embodiments, the streaming unit 100 is configured to record the audio and/or video data of the user and generate streaming data to transmit to the server 10. The viewing unit 200 is configured to receive and reproduce streaming data from server 10. In some embodiments, a user may activate the streaming unit 100 when broadcasting or activate the viewing unit 200 when watching streaming respectively. In some embodiments, the user terminal who is activating the streaming unit 100 may be referred to as an streamer or be referred to as the user terminal which generates the streaming data. The user terminal who is activating the viewing unit 200 may be referred to as an viewer or be referred to as the user terminal which reproduces the streaming data.

The streaming unit 100 may include video control unit 102, audio control unit 104, distribution unit 106 and UI control unit 108. The video control unit 102 may be connected to a camera (not shown) and the video is controlled by the camera. The video control unit 102 may obtain the video data from the camera. The audio control unit 104 may be connected to a microphone (not shown) and the audio is controlled by the microphone. The audio control unit 104 may obtain the audio data from the microphone.

The distribution unit 106 receives streaming data, which includes video data from the video control unit 102 and audio data from the audio control unit 104, and transmits to the server 10 via network NW. In some embodiments, the distribution unit 106 transmits the streaming data in real-time. In other words, the generation of the streaming data from the video control unit 102 and audio control unit 104, and the distribution of the distribution unit 106 is performed simultaneously.

UI control unit 108 controls the UI for the streamer. The UI control unit 108 is connected to a display (not shown) and is configured to generate the streaming data to whom the distribution unit 106 transmits, reproduces and displays the streaming data on the display. The UI control unit 108 shows the object for operating or the object for instruction-receiving on the display and is configured to receive the tap input from the streamer.

The viewing unit 200 may include UI control unit 202, rendering unit 204 and input transmission unit 206. The viewing unit 200 is configured to receive streaming data from server 10 via network NW. The UI control unit 202 controls the UI for the viewer. The UI control unit 202 is connected to a display (not shown) and/or speaker (not shown) and is configured to display the video on the display and output the audio from the speaker by reproducing the streaming data. In some embodiments, Outputting the video on the display and audio from the speaker may be referred to as "reproducing the streaming data".

The UI control unit 202 may be connected to an input unit such as touch panel, keyboard or display or the like to obtain input from the users. The rendering unit 204 may be configured to render the streaming data from the server 10 and the frame image. The frame image may include user interface objects for receiving input from the user, the comments inputted by the viewers and the data received from the server 10. The input transmission unit 206 is configured to receive the user input from the UI control unit 202 and transmit to the server 10 via the network NW.

Figure 3:
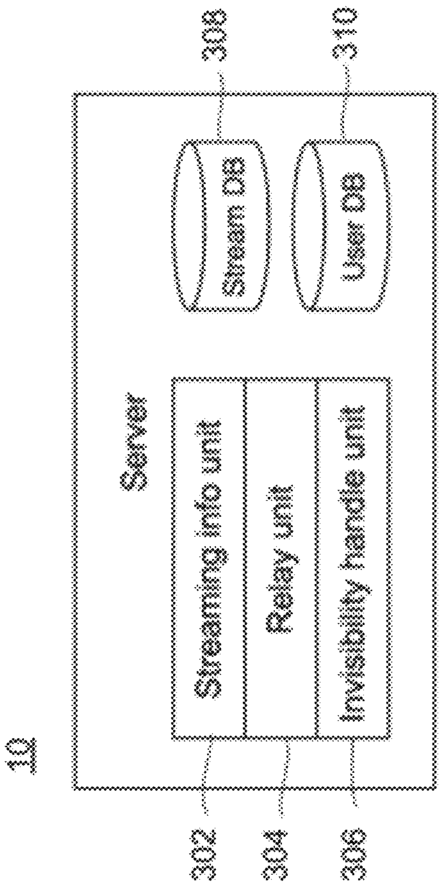
FIG. 3 is a schematic block diagram of the server 10 according to some embodiments of subject application.

FIG. 3 is a schematic block diagram of the server 10 according to some embodiments of the subject application. The server 10 may include streaming info unit 302, relay unit 304, invisible handling unit 306, stream DB 308 and user DB 310.

The streaming info unit 302 receives the request of live streaming from the user terminal 20 of the streamer via the network NW. Once receiving the request, the streaming info unit 302 registers the information of the live streaming on the stream DB 308. In some embodiments, the information of the live streaming may be the stream ID of the live streaming and/or the streamer ID of the streamer corresponding to the live streaming.

Once receiving the request of providing the information of the live streaming from the viewing unit 200 of the user terminal 30 from the viewer via the network NW, the streaming info unit 302 refers to the stream DB 308 and generates a list of the available live streaming.

The streaming info unit 302 then transmits the list to the user terminal 30 via the network NW. The UI control unit 202 of the user terminal 30 generates a live streaming selection screen according to the list and displays the list on the display of the user terminal 30.

Once the input transmission unit 206 of the user terminal 30 receives the selection of the live streaming from the viewer on the live streaming selection screen, it generates the streaming request including the stream ID of the selected live streaming and transmits to the server 10 via the network. The streaming info unit 302 may start to provide the live streaming, which is specified by the stream ID in the streaming request, to the user terminal 30. The streaming info unit 302 may update the stream DB 316 to add the viewer's viewer ID of the user terminal 30 to the streamer ID of the stream ID.

The relay unit 304 may relay the transmission of the live streaming from the user terminal 20 of the streamer to the user terminal 30 of the viewer in the live streaming started by the streaming info unit 302. The relay unit 304 may receive the signal, which indicates the user input from the viewer, from the input transmission unit 206 while the streaming data is reproducing. The signal indicating the user input may be the object-designated signal which indicates the designation of the object shown on the display of the user terminal 30. The object-designated signal may include the viewer ID of the viewer, the streamer ID of the streamer, who delivers the live streaming the viewer is viewing, and object ID specified by the object. If the object is a gift or the like, the object ID may be the gift ID or the like. Similarly, the relay unit 304 may receive the signal indicating the user input of the streamer, for example the object-designated signal, from the streaming unit 100 of the user terminal 20 while the streaming data is reproducing.

FIG. 4 shows an exemplary data structure of the stream DB 308 of FIG. 3. The stream DB 308 associatively stores the stream ID identifying a live streaming, the streamer ID identifying the streamer conducting the respective live streaming, the visible viewer ID identifying the visible or normal viewer viewing the respective live streaming and the invisible viewer ID identifying the invisible viewer viewing the respective live streaming.

Figure 5:
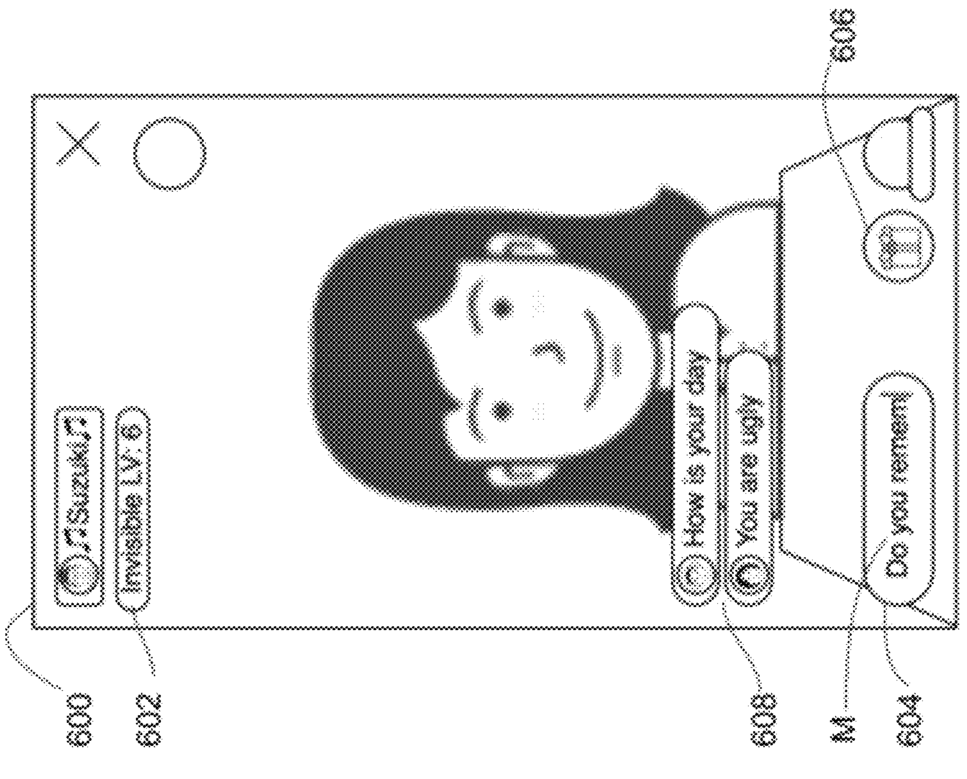
FIG. 5 and FIG. 10 is exemplary screens of the viewer according to some embodiments of subject application.

FIG. 5 is an exemplary screen 600 of the viewer of the user terminal 30 according to some embodiments of subject application. The viewer of the user terminal 30 may enter a live streaming as an invisible viewer. As shown in FIG. 5, no entering animation or entering message is shown in the live streaming when the invisible viewer enters. In some embodiments, the streamers and the other viewers may not notice the invisible viewer entering the live streaming. In some embodiments, the APP provider or the server 10 may provide the user terminal 20 of the streamer or the user terminal 30 of the viewer(s) with a viewer list for the streamers or other viewers to check who is in the live streaming. Such a viewer list is generated by referring to the stream DB 308 by including the visible viewer ID in the list and excluding the invisible viewer ID from the list. In some embodiments, the user terminal 20, 30 may be configured so that the streamers or other viewers may notice and interact with the visible viewer on the viewer list such as commenting, tagging, poking or the like. In some embodiments, the invisible viewer may not be shown on the viewer list so that the streamers or viewers may not notice or interact with the invisible viewer.

As shown in FIG. 5, the screen 600 of the invisible viewer may include a status object 602, commenting object 604, a gifting object 606 and a message zone 608. The status object 602 may show the current status of the viewer as visible or invisible. In some embodiments, the status object 602 may further show the level of the viewer for being invisible as shown in FIG. 5. The commenting object 604 may allow the viewer to type a message or emoji to interact with the streamers or viewers. The gifting object 606 may allow the viewer to send gifts or donate the streamers for entertainment. The message zone 608 may show the messages in the live streaming. In some embodiments, the message zone 608 may also show the entering message such as "Tanaka is entering the live streaming" or other information in the live streaming.

In some embodiments, some features such as commenting and/or gifting may be disabled for the invisible viewer. In some embodiments, the invisible viewer may also be able to comment and/or send gifts in the live streaming. For example, the invisible viewer may type a message M to interact with the streamers as shown in FIG. 5. In some embodiments, the invisible viewer may become visible after commenting, gifting, donating or other interactions in the live streaming.

Figure 6:
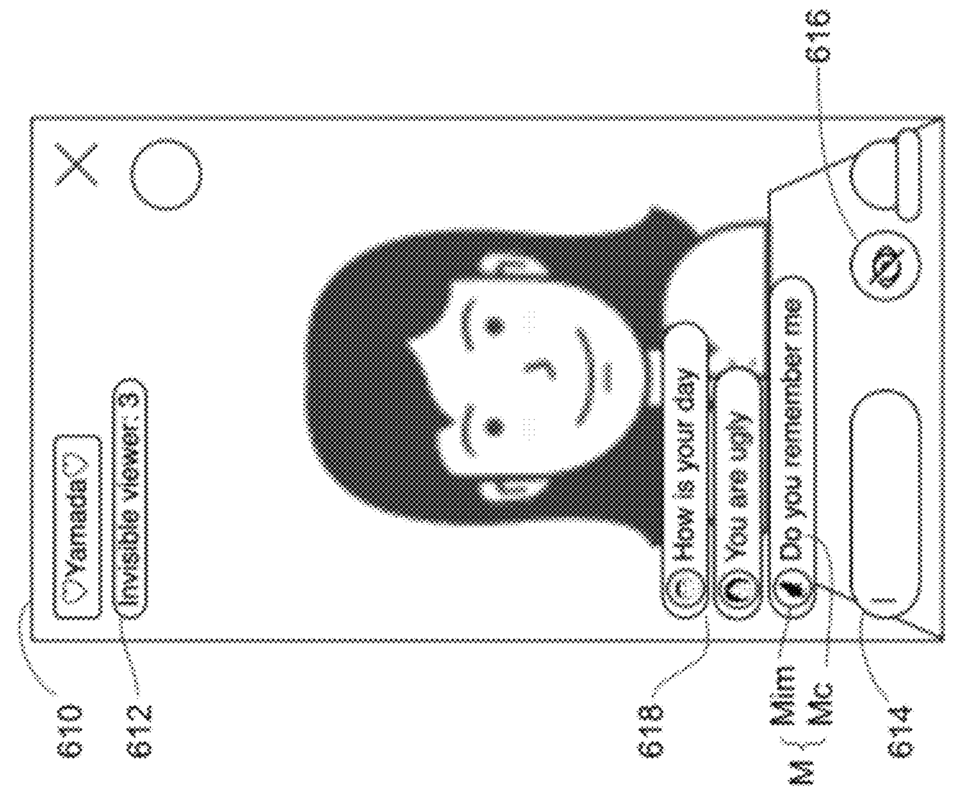
FIG. 6-FIG. 9 are exemplary screens of the streamer according to some embodiments of subject application.

FIG. 6 is an exemplary screen 610 of the streamer according to some embodiments of subject application. The screen 610 of the streamer may include an information object 612, commenting object 614, an invisibility object 616 and a message zone 618. The information object 612 may show the number of invisible viewers in the live streaming. In some embodiments, the information object 612 may not be shown on the screen of the streamer so that the streamer may not notice the existence of the invisible viewer. In some embodiments, the information object 612 may show an "YES" or "No" to indicate whether there is an invisible viewer in the live streaming. In some embodiments, the invisible viewer may be visible to the streamer only so the streamer may notice and understand the invisible viewer. The UI control unit 108 of the user terminal 20 of the streamer sends, to the server 10 via the network, a request for the information on the invisible user (ex. the number of the invisible user). The invisibility handle unit 306, upon receipt of the request, refers to the stream DB 308 and identifies the requested information. The unit 306 generates a response including the identified information and sends the response to the user terminal 20 via the network. The UI control unit 108 of the user terminal 20 refers to the information included in the received response and generates the information object 612.

The commenting object 614 may allow the streamer to type a message or emoji to interact with the viewers. The invisibility object 616 may allow the streamer to set information on other viewers invisible. The message zone 618 may show the messages in the live streaming. In some embodiments, the message zone 618 may show similar messages as that in the message zone 608.

In some embodiments, the invisible viewer may perform an action in the live streaming. For example, the invisible viewer may comment on the streamer with the message M of "Do you remember me". In response to detecting the action of commenting from the invisible viewer in the live streaming, the invisible handling unit 306 may set at least a part of the message M visible to at least a part of the other viewers and the streamer. As shown in FIG. 6, the message M is shown on the screen 610 of the streamer. In some embodiments, the message M may include commenter image Mim and contents Mc. The invisible handling unit 306 may set at least a part of the message M visible. For example, the commenter image Mim may be replaced with a random image such as a black cat while showing the contents Mc as shown in FIG. 6. As such, the streamer or other viewers may notice that there is a viewer commenting without understanding who the viewer is. In some embodiments, the commenter image Mim may be shown while hiding or encrypting the contents Mc of the message M. In some embodiments, the message M may include viewer ID or the like. In some embodiments, which part of the message M is invisible or visible may be determined according to practical need.

Figure 8:
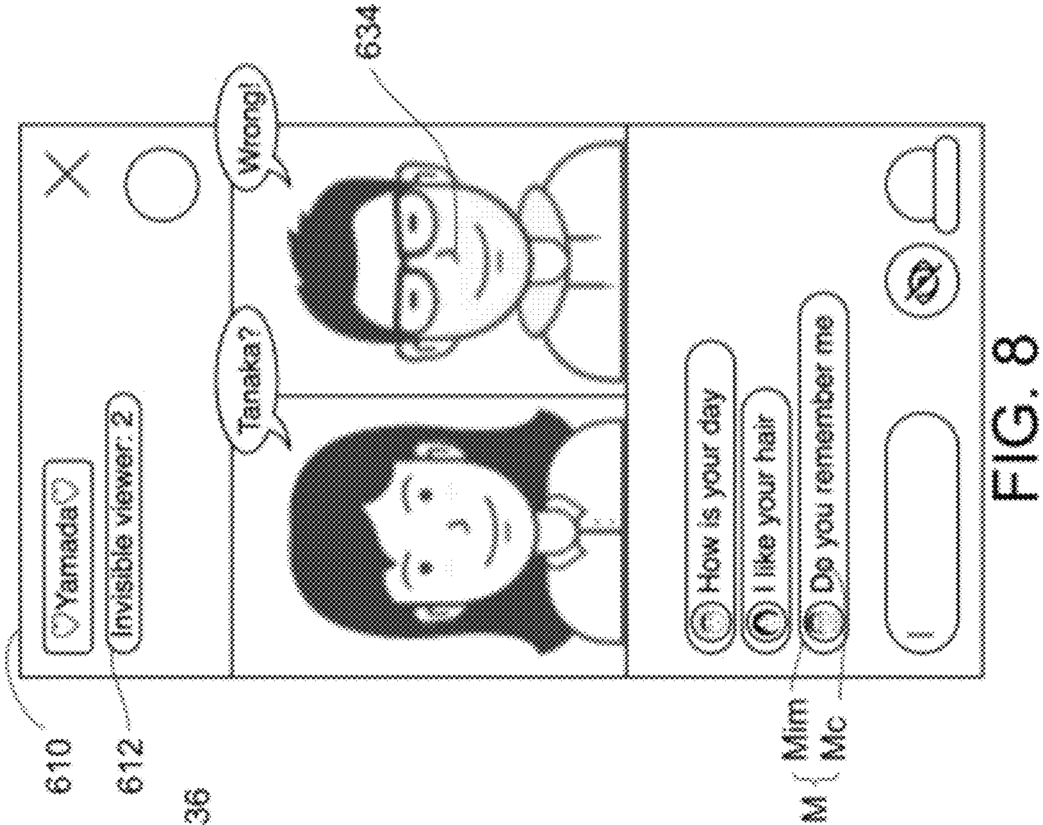
Figure 7:
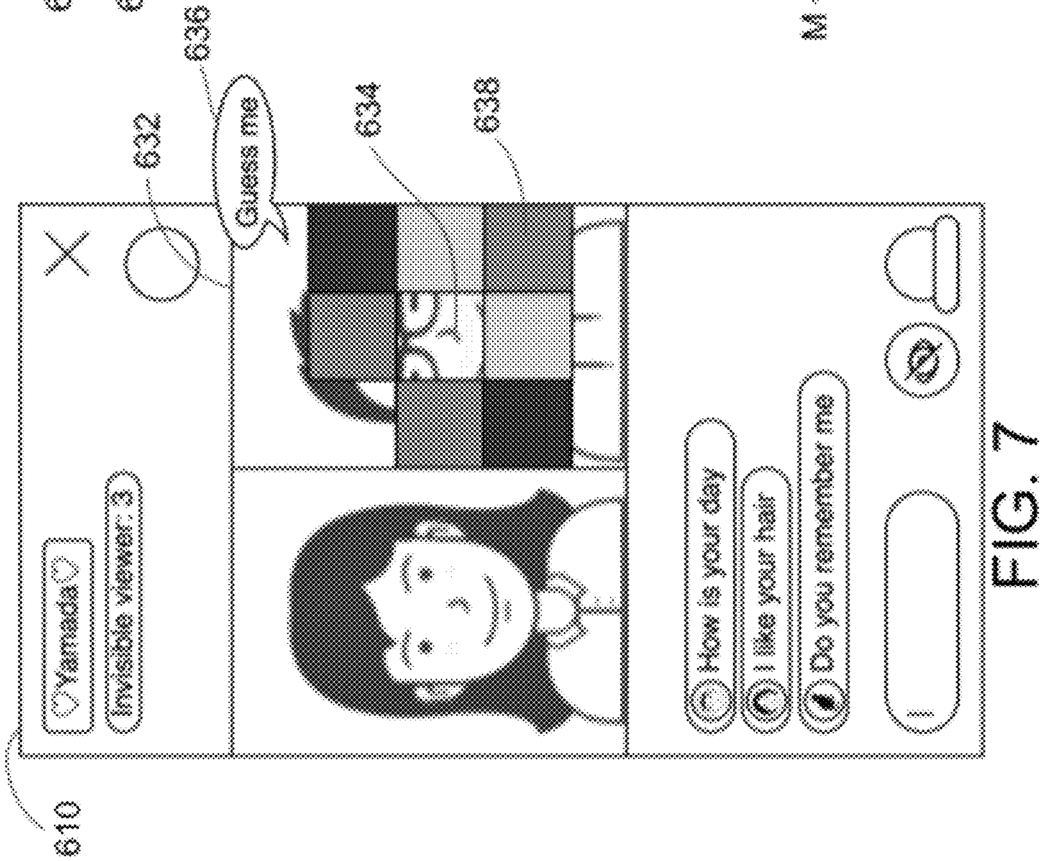

FIG. 7 and FIG. 8 are exemplary screens 610 of the streamer according to some embodiments of subject application. In some embodiments, the invisible viewer may turn on his/her camera and/or microphone. For example, the invisible viewer may have a group chat with the streamer(s). In some embodiments, the group chat may be a video and/or audio interaction with the other streamer(s) for conference, entertainment, chatting or the like. In some embodiments, the invisible viewer may have a voice chat with the streamer. If the invisible viewer has a group call with the streamer, the audio and video of the invisible viewer may be regarded as the information of the invisible viewer. In some embodiments, in response to the action of initiating a group call from the invisible viewer, the invisible handling unit 306 may set at least a part of the information on the invisible viewer visible.

As shown in FIG. 7, the video of the invisible viewer may include the frame 632 and image 634. The audio of the invisible viewer may include the audio 636. In some embodiments, the frame 632, image 634 and audio 636 may be regarded as the information of the invisible viewer. In some embodiments, the invisible handling unit 306 may set the frame 632 visible while setting the image 634 invisible. For example, the frame 632 may be shown without showing the image 634 of the invisible viewer, such that other viewers and streamer(s) may notice that there is an invisible viewer without understanding who the invisible viewer is.

In some embodiments, the image 634 may be blocked or overlapped by an object 638 as shown in FIG. 7. In some embodiments, the object 638 may be a mosaic or random image. In some embodiments, the object 638 may cover or overlap at least a part of the invisible viewer on the image 634. In some embodiments, the image 634 may be a still picture or moving video. In some embodiments, the audio 636 of the invisible viewer may be converted into another voice such as duck or animation characters' voice.

In some embodiments, the object 638 may cover all of the image 634. In some embodiments, the object 638 may cover only a part of the image 634. In some embodiments, the object 638 may cover the face of the invisible viewer on the image 634. In some embodiments, the object 638 may cover the facial feature of the invisible viewer on the image 634. In some embodiments, the object 638 may cover a part of the invisible viewer so that the streamer or other viewer may notice the invisible without understanding who the invisible is.

In response to action from the invisible viewer, the object 638 covered on the image 634 may be partially discovered to show more information on the invisible viewer. As shown in FIG. 7, the object 638 may include a nine square mosaic, for example. In some embodiments, the invisible viewer may delete a square of the mosaic to show more information. In some embodiments, the streamer may also delete a square of the mosaic to receive more information. In some embodiments, the mosaic may disappear in response to action from other viewers or APP providers. In some embodiments, deleting the square may be achieved by donating, purchasing, commenting or other interaction or the like. In some embodiments, the square of the mosaic may disappear automatically in each one minute or the like.

If all the information on the invisible viewer is visible, the invisible handling unit 306 may make the invisible visible to other viewers and a streamer as default. As shown in FIG. 8, all the squares of the object 638 have disappeared and the information, such as image 634, on the invisible viewer is visible now. In some embodiments, the invisible handling unit 306 may set all information on the invisible viewer visible when the streamer or other viewers understands who the invisible viewer is. For example, if the streamer finds out who the invisible viewer is, the invisible handling unit 306 may set the invisible viewer visible as default. Here, the "Setting viewer visible as default" may refer to the original setting for a viewer to enter a live streaming such as showing the entering animation or being shown on the viewer list. The invisible handling unit 306 updates the stream DB 308 so that the invisible user becomes visible. As shown in FIG. 8, the object 638 covering the image 634 has disappeared and the commenter image Mim returns to the original image. Moreover, the information object 612 showing the number of invisible viewers may decrease because the invisible viewer is visible now.

One of the technical advantages of an embodiment is that the system can encourage further communication between the streamer and the viewer, by first the viewer entering the streaming room as invisible, then the steamer trying to identify who he/she is. This will enhance user-user interactions through the live streaming.

Figure 9:
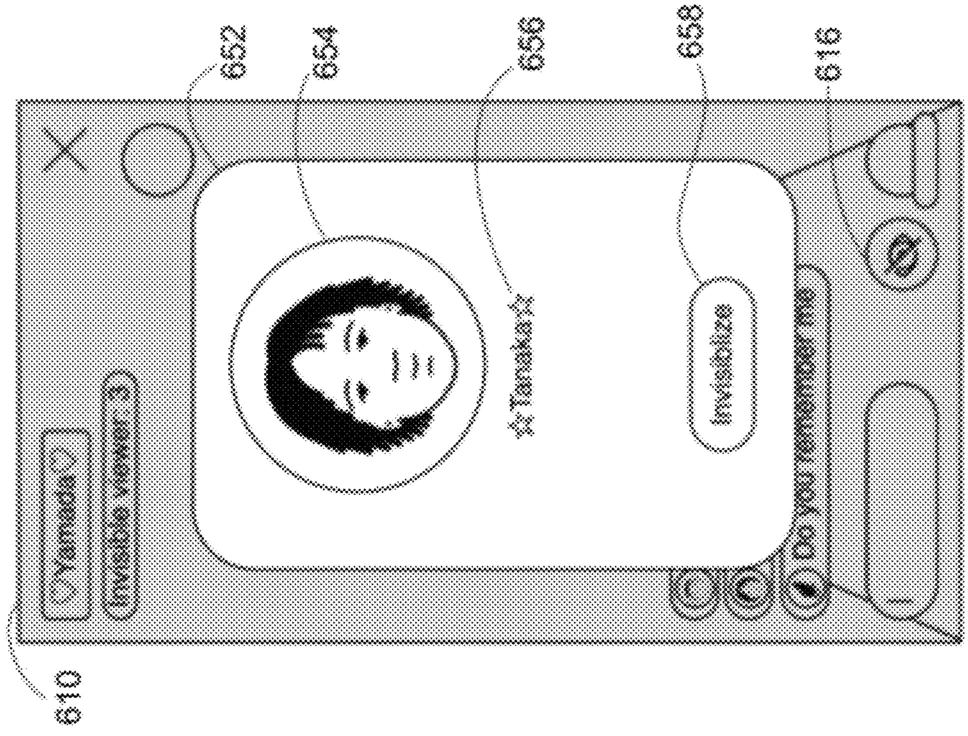

FIG. 9 is an exemplary screen 610 of the streamer according to some embodiments of subject application. In some embodiments, the streamer may use the invisibility object 616 to make a viewer invisible. For example, A viewer comments about "you are ugly" in the live streaming and the streamer notices that the viewer is disturbing. The streamer may click, tap or touch on the invisibility object 616 to select the viewer. In some embodiments, the streamer may tap on the message, image or viewer ID corresponding to the viewer to make the viewer invisible.

As shown in FIG. 9, a sub-screen 652 may be shown after the streamer selects a viewer. In the sub-screen 652, it may include viewer image 654, viewer ID 656 and an button 658 for invisibility. The viewer image 654 and viewer ID show the image and ID of the viewer. The button 658 may make the viewer invisible corresponding to the viewer image and viewer ID. In some embodiments, the streamer may tap the button 658 to make the viewer invisible. By doing that, the viewer disturbing the live streaming may be invisible to the streamer or other viewers.

In some embodiments, the viewer may be invisible to other viewers but still visible to the streamer. In such situations, other viewers won't see the disturbing message from the invisible viewer so the atmosphere of the live streaming will not be disturbed. Moreover, since the invisible viewer is still visible to the streamer, the invisible viewer may not sense that he/she is invisible.

Figure 10:
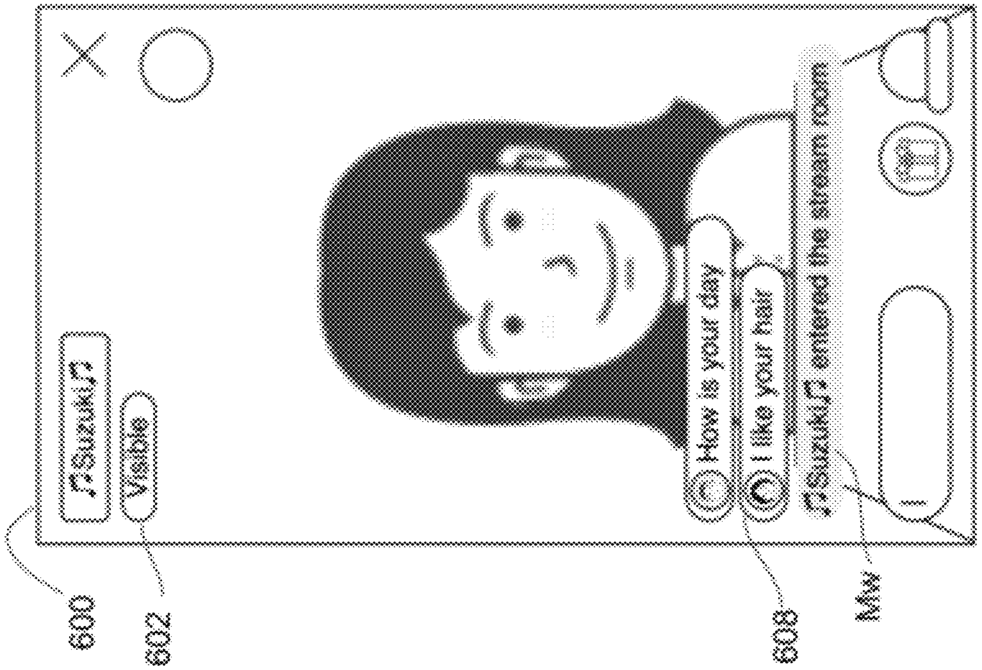

FIG. 10 is an exemplary screen of the viewer according to some embodiments of subject application. As shown in FIG. 10, the status object 602 may show "visible" when the invisible viewer is visible. In some embodiments, an entering message, such as the message Mw, on the message zone 608 may be shown as shown in FIG. 10. In some embodiments, all the features such as entering animation or the like may return to default if the invisible viewer is visible. The screen shown in FIG. 10 is similar to a screen shown immediately after the viewer entered in the live streaming as a visible user. Therefore, the invisible user can pretend that he/she just joined the live streaming whereas the truth is that he/she was watching the live streaming from a while ago.

Figure 11:
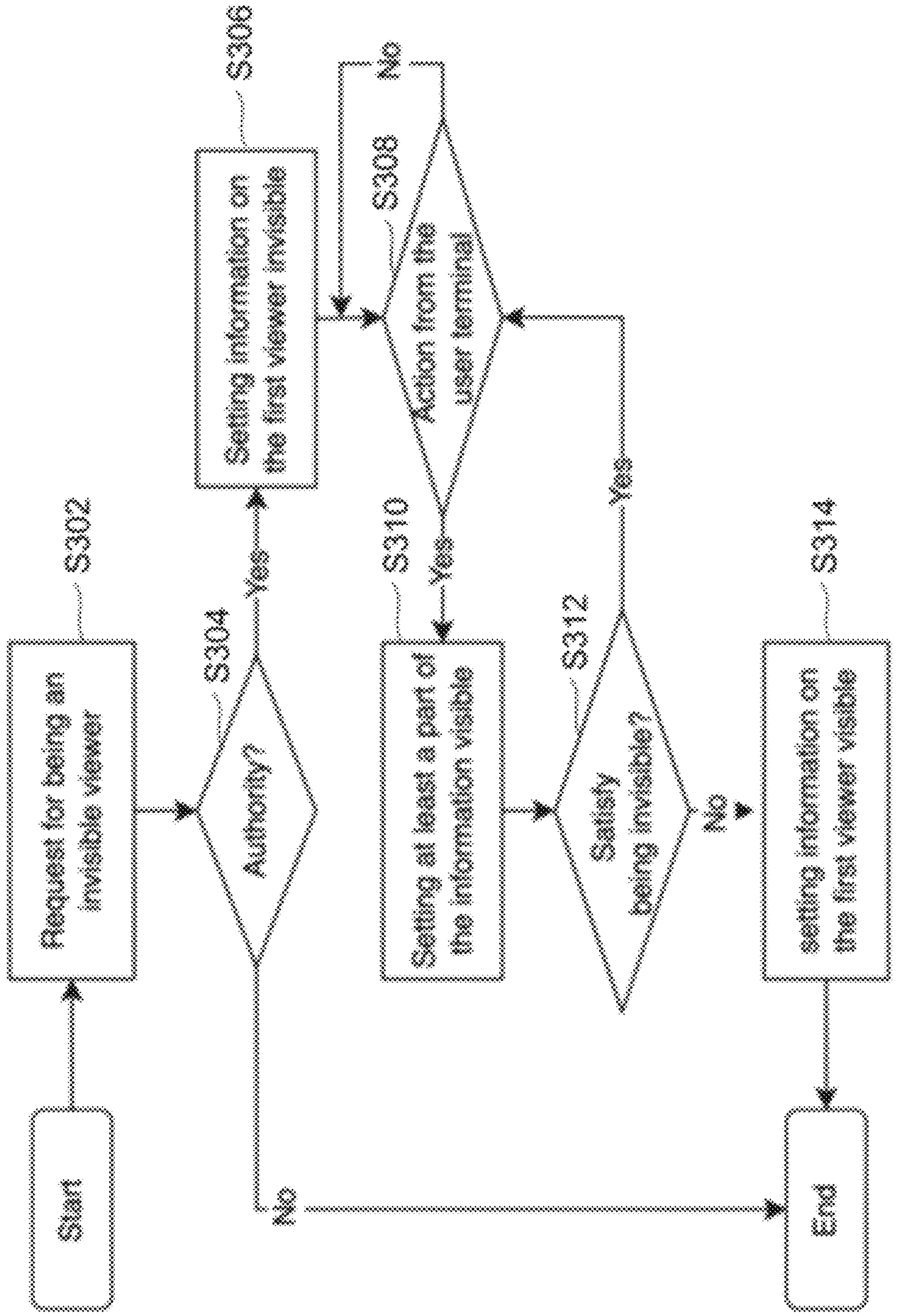
FIG. 11 is an exemplary sequence chart illustrating an operation of the configuration of the live streaming system 1 according to some embodiments of subject application.

FIG. 11 is an exemplary sequence chart illustrating an operation of the configuration of the live streaming system 1 according to some embodiments of subject application. The invisible handling unit 306 obtains a request for entering the live streaming as an invisible viewer (S302). More specifically, the invisible handling unit 306 may obtain the request by communicating with the user terminals 20 or 30 from the users. In some embodiments, the invisible viewer may be the streamer or the viewer. In some embodiments, the request may be requested before entering a live streaming or when being in a live streaming.

In some embodiments, the request may be sent by the invisible viewer. In some embodiments, the request may be sent by the streamer. In some embodiments, the request may be sent by other viewers. In other words, the invisible viewer may be able to send a request to be invisible. The streamer and the other viewers may also be able to make a viewer or himself/herself invisible.

Here, the viewer of the user terminal 30 may be referred to as the viewer to be an invisible viewer. In response to obtaining the request, the invisible handling unit 306 refers to the user DB 310 and checks the authority of the user terminal 30 for being an invisible viewer. In some embodiments, the user terminal 30 may receive authority by purchasing a membership for being an invisible viewer. In some embodiments, the user terminal 30 may receive authority by commenting, donating or gifting to a specific amount. For example, the viewer may earn experience by interacting with the streamer or engaging in the APP, and the server 10 may give authority to the viewer if the experience achieves a threshold. In some embodiments, the invisible handling unit 306 may check the authority according to the historical data of the viewer. In some embodiments, the historical data may be the data stated in the specification or the like.

If the user terminal 30 is not authorized to be an invisible viewer (No in S304), the invisible handling unit 306 may reject the request and end the procedure. Moreover, the invisible handling unit 306 may further send a message to the requester to inform of the lack of authority. In some embodiments, the invisible handling unit 306 may further send messages to get the requester to access the purchase page or information page.

If the user terminal 30 is authorized to be an invisible viewer (Yes in S304), the invisible handling unit 306 may set information on the user terminal 30 invisible to other viewers and the streamer (S306). In some embodiments, the server 10 may start to provide the user terminal 30 with the streaming data for the live streaming while setting information on the user terminal 30 invisible to other viewers and the streamer. In some embodiments, the information on the user terminal 30 may include the video, audio, image or text data or the like of the user terminal 30 or the viewer/user of the user terminal 30. For example, the information may include the display image, display ID, commenting message, text message, gifting message, animation, video and audio generated by entering the live streaming or by gifting, voice or video collected by microphone or camera or the like or the combination of above.

In some embodiments, the invisible viewer may refer to the viewer who is not noticed by other viewers when entering the live streaming or being in the live streaming. In some embodiments, the invisible viewer may be invisible to a portion of viewers or a specific group of viewers. In some embodiments, the invisible viewer may only be visible to the portion of viewers or the specific group of viewers. In some embodiments, the portion of viewers may be selected by the requester or by the invisible viewer. In some embodiments, the portion of viewers may also be predetermined by the APP provider. In some embodiments, the specific group of viewers may be the users who are specified by the requester, invisible viewer, streamer or the APP provider. For example, the specific group of viewers may be the user in the friend list, follower list or following list of the requester, the invisible viewer, streamer. Here, the "friend" may refer to the feature for adding a user as friends on an APP.

In some embodiments, the specific group of viewers may also refer to the combination of the above group. For example, the specific group of viewers may further include the user in the friends list of the friends list of the requester, invisible viewer, streamer or the like. In some embodiments, the specific group of viewers may further include the friends list of the follower list of the requester, invisible viewer, streamer or the like. In some embodiments, the combination of the above group may be determined by the requester, invisible viewer, streamer or the APP provider according to the practical need.

In some embodiments, the specific group of viewers may also be classified by some parameters set by the APP provider such as level, experience value, watching time, engaging time or the like or the combination of above.

In some embodiments, setting information invisible may also refer to setting information encrypted or hidden so that other viewers may notice there is an invisible viewer but cannot understand who the invisible viewer is. For example, the viewer ID of the invisible viewer may be encrypted or converted into a random string. the display image of the invisible viewer may be hidden, blocked or replaced with another random image. In some embodiments, the video of the invisible viewer may be covered by mosaic or random image. In some embodiments, the video of the invisible viewer may be covered by mosaic or random image.

In some embodiments, at least facial features of the video of the invisible viewer may be covered. In some embodiments, the eyebrows, eyes, ears, nose, lips or chin of the video of the invisible viewer may be covered. In some embodiments, the audio of the invisible viewer may be converted into a different voice. Here, the video and audio may be the image and voice when the invisible viewer turns on the camera and/or microphone, for example, joining a group call with the streamer or the like.

Referring to FIG. 5, the invisible handling unit 306 may further receive action from other users such as the invisible viewer. In some embodiments, the invisible handling unit 306 may receive actions from the invisible viewer, other viewers, streamer(s) or the like or the combination of above. If the invisible handling unit 306 does not receive action from users (No in S308), the invisible handling unit 306 may hold on and wait for the action from the users.

Once the invisible handling unit 306 receives action from the user (Yes in S308), the invisible handling unit 306 may further set at least a part of the information visible (S310). In some embodiments, the invisible handling unit 306 may set at least a part of the information visible to at least a part of the other viewers and the streamer. In some embodiments, the action may be an action performed by the invisible viewer, other viewers, streamers, the APP provider or the like or the combination of above. For example, the invisible viewer may send a message in the live streaming. In response to sending messages from the invisible viewer, the invisible handling unit 306 may set at least a part of the message visible by showing the message with a covered display image. In some embodiments, the invisible handling unit 306 may show the messages with encrypted viewer ID or the like.

In some embodiments, the invisible handling unit 306 may further check whether the invisible viewer satisfies being invisible or not (S312). For example, the app provider may provide time-limited invisible membership to the invisible viewer. In such situations, the invisible viewer may not be satisfied being invisible when the time period is run out. In some embodiments, the invisible viewer may not be satisfied being invisible when all the information on the invisible viewer is set visible to other viewers and streamer.

In some embodiments, if the invisible viewer is satisfied being invisible (Yes in S312), the invisible handling unit 306 may repeat the steps of S308, S310 and S312.

if the invisible viewer is not satisfied being invisible anymore (No in S312), the invisible handling unit 306 may set information on the invisible viewer visible (S314).

In some embodiments, the information on the invisible viewer may include a plurality of objects. For example, if the invisible viewer comments on the streamer, the information of the invisible viewer may include viewer image, viewer ID, message contents or the like. if the invisible viewer invites the streamer to have a group call, the information of the invisible viewer may include the video, the frame enclosing the video, the audio or the like. In some embodiments, the invisible handling unit 306 may set at least one of the objects visible. For example, the invisible handling unit 306 may set the message contents visible only. In some embodiments, the invisible handling unit 306 may set the frame, which encloses the video, visible only.

In some embodiments, if the invisible viewer is satisfied being invisible, the invisible handling unit 306 may further receive another action from the invisible viewer. In some embodiments, the invisible handling unit 306 may further receive actions from the streamer or other viewers. In response to detecting another action of the invisible viewer, the invisible handling unit 306 may further set at least a part of the information visible. More specifically, the invisible handling unit 306 may set at least one of the invisible objects visible. For example, the invisible viewer may type a message of "Do you remember me" to the live streaming. The invisible handling unit 306 may show the message contents. If the streamer does not recognize the invisible viewer, the invisible handling unit 306 may further set the viewer image visible to the streamer in response to another actions of the invisible viewer. In some embodiments, the another actions may be tapping, clicking or touching an object on the user terminal to instruct the invisible handling unit 306 to discover more information.

In some embodiments, the invisible viewer may be regarded as being in an invisible mode when he/she is invisible. In some embodiments, the invisible mode may be no-time-limit and be ended in response to the request of the invisible viewer, streamer or other viewers. In some embodiments, the time period of the invisible mode may be time-limited such as one hour, one day, one week, a specific time period or the like. In some embodiments, the time-limited invisible mode may be extended by the actions such as gifting, donating or purchasing or the like.

In some embodiments, the server 10 may provide an invisibility item to make the invisible viewer visible. In some embodiments, the server 10 may provide another item to prevent the viewer from being visible by the invisibility item.

In some embodiments, the server 10 may provide an invisibility level system such as the level shown on object 602 in FIG. 5. The viewer may upgrade the level by commenting, gifting, donating, purchasing or the like. In some embodiments, the invisible viewer with higher level may still notice and understand the invisible viewer with lower level. In other words, the invisible viewer with lower level may still be visible to the invisible viewer with higher level. In some embodiments, the functions and features may be designed according to the practical need.

In some embodiments, the streamer can set a criteria for a visible viewer. The criteria may be determined in terms of the degree of engagement between the streamer and the viewer. For example, if the invisibility handle unit 306 receives a request for entering a live streaming of a streamer, the unit 306 refers to a log data (not shown in figures) to obtain the length (hereinafter, "viewing time") of duration in which the requester viewed the streaming(s) of the streamer in the past. The unit 306 compares the viewing time with a threshold value. If the viewing time is more than or equal to the threshold value, then the unit 306 determines that the requester enters into the live streaming as an invisible user. If the viewing time is less than the threshold value, then the unit 306 determines that the requester enters into the live streaming as a normal or visible user. By doing so, the streamer can set old viewers or viewers who know the streamer very well as invisible and can set viewers new to the streamer as visible. Since the invisible users may not be seen by the visible user in the live streaming, the "new" viewers can have more interaction with the streamer in the live streaming without being disturbed by the old viewers, while the old viewers still can participate in the live streaming of the streamer.

Figure 12:
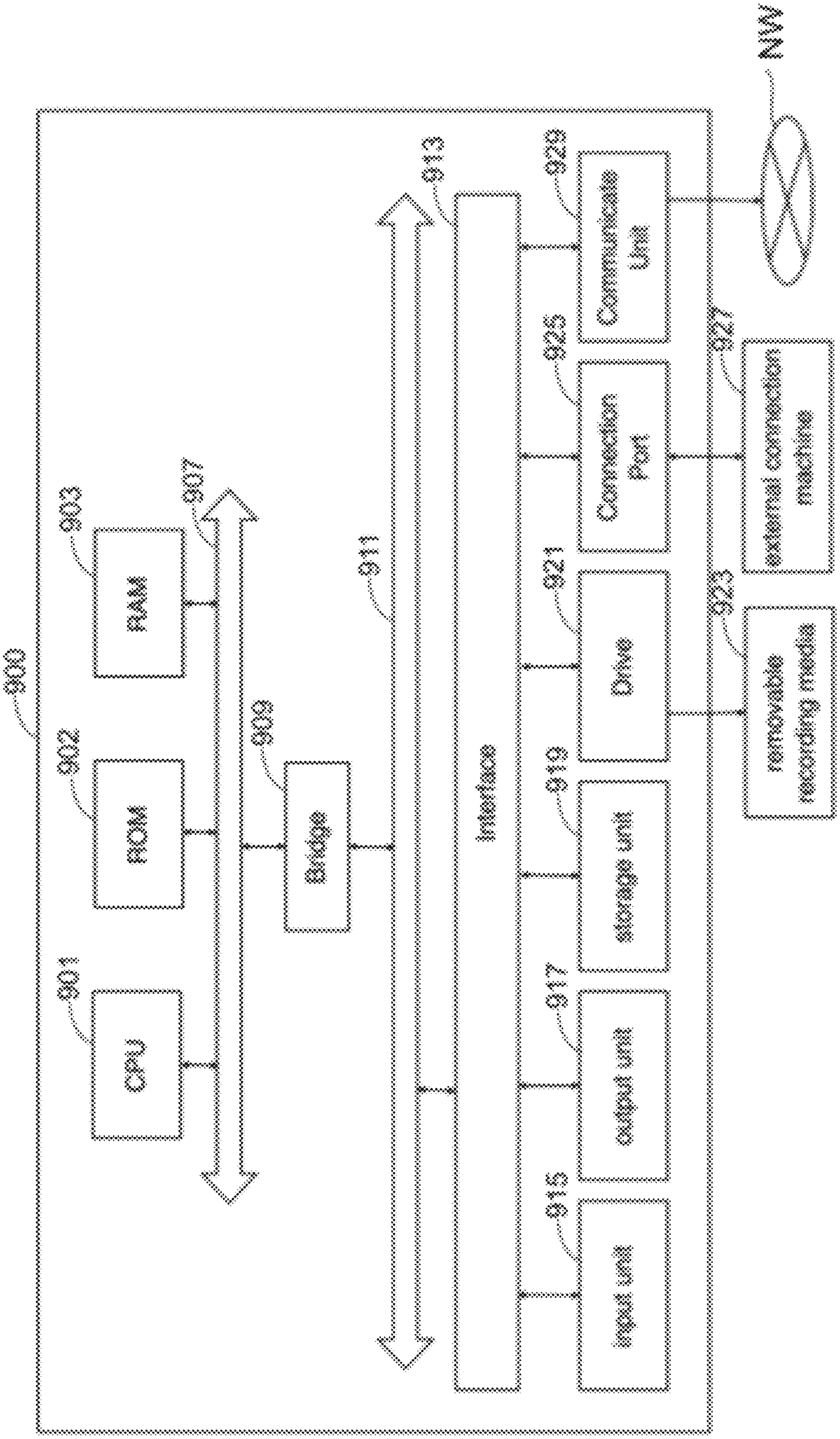
FIG. 12 is an exemplary hardware configuration of the information processing device according to some embodiments of subject application.

Please refer to FIG. 12, the hardware configuration of the information processing device 900 according to some embodiments of subject application will be described below. FIG. 12 is an exemplary hardware configuration of the information processing device 900 according to some embodiments of subject application. The information processing device 900 in FIG. 12 is, for example, is configured to realize the server 10 and the user terminal 20 and 30 respectively according to some embodiments of subject application.

The information processing device 900 includes a CPU 901, read only memory (ROM) 903, and random access memory (RAM) 905. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage unit 919, or a removable recording medium 923. For example, the CPU 901 controls overall operations of respective function units included in the server 10 and the user terminal 20 and 30 of the above-described embodiment. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote control device that uses, for example, infrared radiation and another type of radio waves. Alternatively, the input unit 915 may be an external connection device 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 905. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals in the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device, and generates a captured image. The imaging device may capture a still picture, or may capture a movie.

The present disclosure of the live streaming system 1 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the server 10 may be performed by other than the server 10, for example, being performed by the user terminal 20 or 30. In some embodiments, at least a part of the functions performed by the user terminal 20 or 30 may be performed by other than the user terminal 20 or 30, for example, being performed by the server 10. In some embodiments, the rendering of the frame image may be performed by the user terminal of the viewer, the server, the user terminal of the streamer or the like.

Furthermore, the system and method described in the above embodiments may be provided with a computer-readable non-transitory storage device such as a solid state memory device, an optical disk storage device, or a magnetic disk storage device. Alternatively, the programs may be downloaded from a server via the Internet.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the above patent application scope.

OTHER EMBODIMENTS

When an application program of live streaming (hereinafter referred to as a live streaming application) is opened or started on a user terminal, typically displayed is a list of live streamings currently being performed. The user selects a desired live streaming from the list. At this time, information on each live streaming provided in the list is only about the ID and genre of the streamer (distributor) of the live streaming. It is difficult to know from the list what kind of conversation is actually going on in the live streaming. It may be possible to actually enter the live streaming to know the content of the conversation. However, in this case, the streamer will be notified of the entry of the user to his/her live streaming, so the streamer may say to the user, "Welcome to Mr./Ms. ~". After that, even if it turns out that the ongoing conversation in the live streaming is about an uninteresting topic for the user, the user may hesitate to stop watching at this time because the streamer has spoken to the user. The streamer tries to communicate with the viewer who has entered the room to show his/her hospitality, but this makes the viewer more difficult to exit the live streaming. As such, users may not be able to tell from the list whether a live streaming in the list is interesting for them, and once they enter the live streaming room, they may find it difficult to leave the live streaming room although they find it uninteresting. After all, they would rather not watch live streaming.

In this embodiment, upon selection of a live streaming by a viewer, instead of having the viewer enter the live streaming immediately, the viewer is able to first view the live streaming in a preview mode. The preview mode allows the viewer to view the live streaming without notifying its streamer or other viewers that he/she has entered the live streaming room. The viewer can grasp the content of the conversation taken place in the live streaming in the preview mode, and then enters the room if the viewer finds it interesting. If the viewer finds it uninteresting, then he/she can exit without notifying the streamer or other viewers. In this way, viewers are able to know the content of the conversation before entering the live streaming room, and decide whether to enter the live streaming room based on the detailed content of the conversation. In addition, when exiting from the room after viewing the live streaming in the preview mode, no exit notification is sent to the streamer, so unnecessary exit notifications can be reduced. As a result, it is possible to minimize a decrease in motivation of the streamer to provide live streamings.

Figure 13:
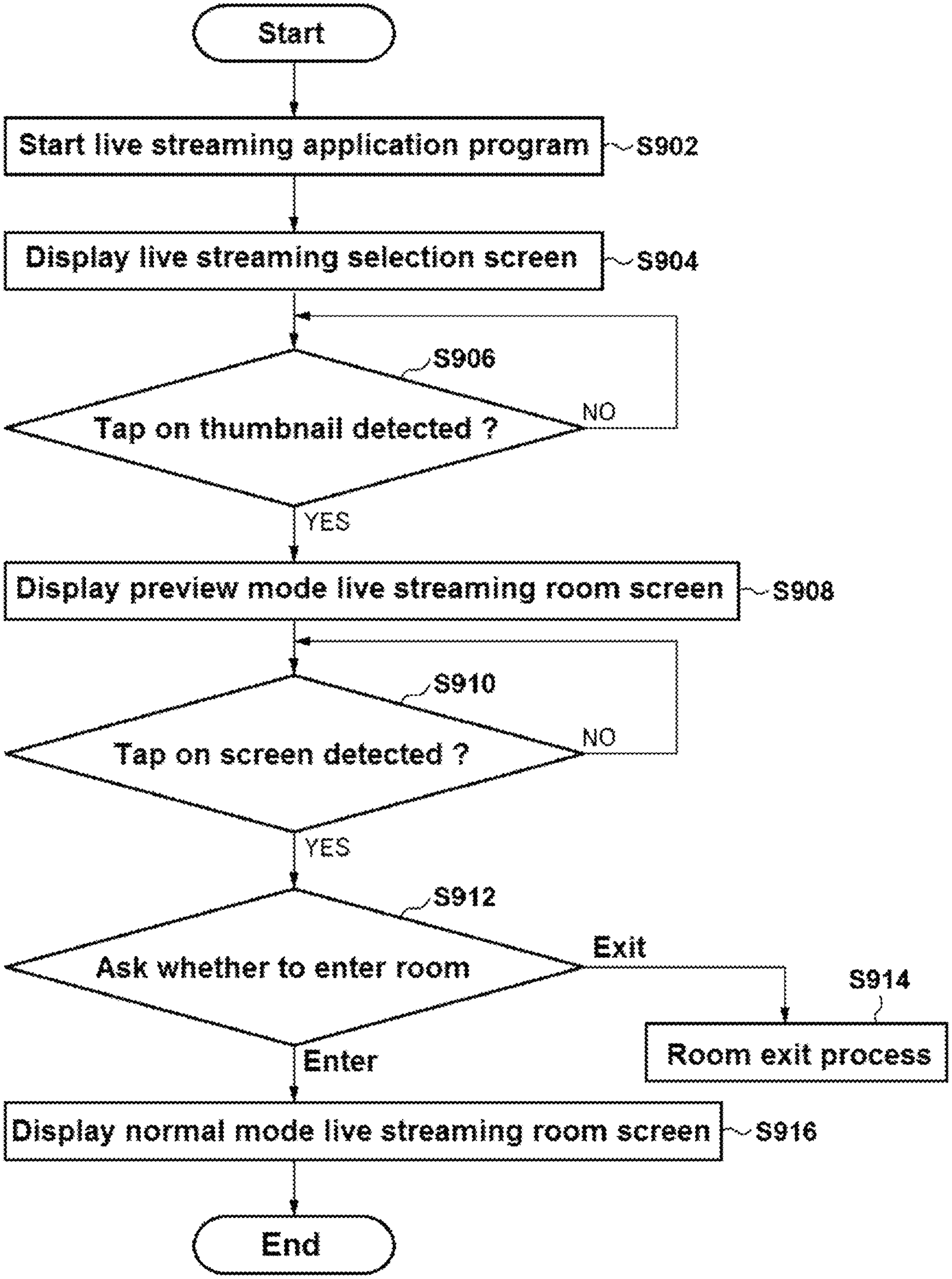
FIG. 13 is a flowchart showing steps of a process performed on a viewer user terminal according to another embodiment.

FIG. 13 is a flowchart showing steps of a process performed on a viewer user terminal according to another embodiment. Once the viewer taps an icon of the live streaming application, the user terminal starts the live streaming application (S902). The user terminal displays a live streaming selection screen on the display (S904).

Figure 14:
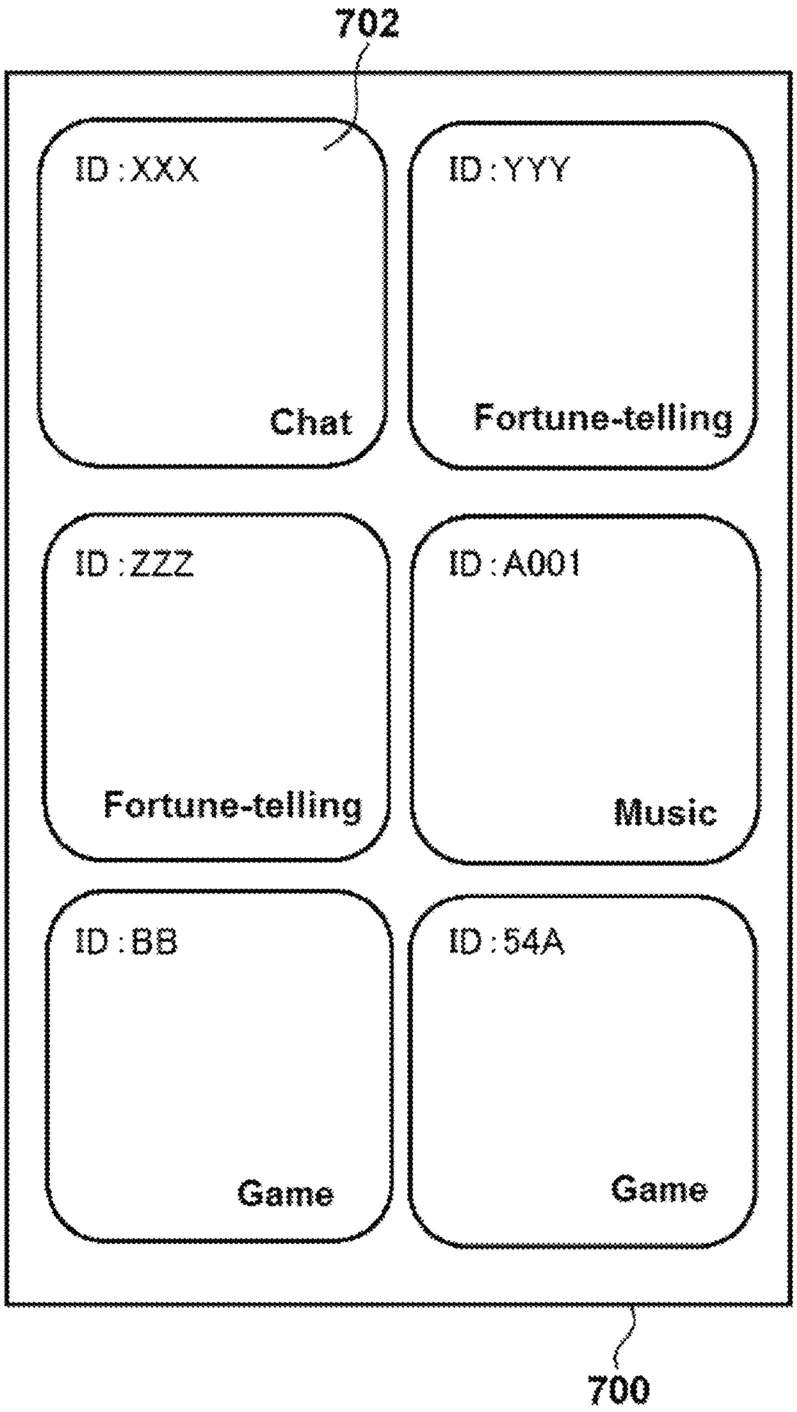
FIG. 14 is an exemplary screen image of a live streaming selection screen displayed on the display of the user terminal.

FIG. 14 is an exemplary screen image of a live streaming selection screen 700 displayed on the display of the user terminal in step S904. The live streaming selection screen 700 includes thumbnails 702 indicating live streamings in a list of currently available live streamings received from the server. Each thumbnail 702 includes a streamer's image and the like, and shows the streamer's ID and the genre of the live streaming.

The user terminal waits for detection of a tap on the thumbnail 702 on the live streaming selection screen 700 (S906). When the tap is detected (Y in S906), the user terminal displays a live streaming room screen in the preview mode on the display (S908).

Figure 15:
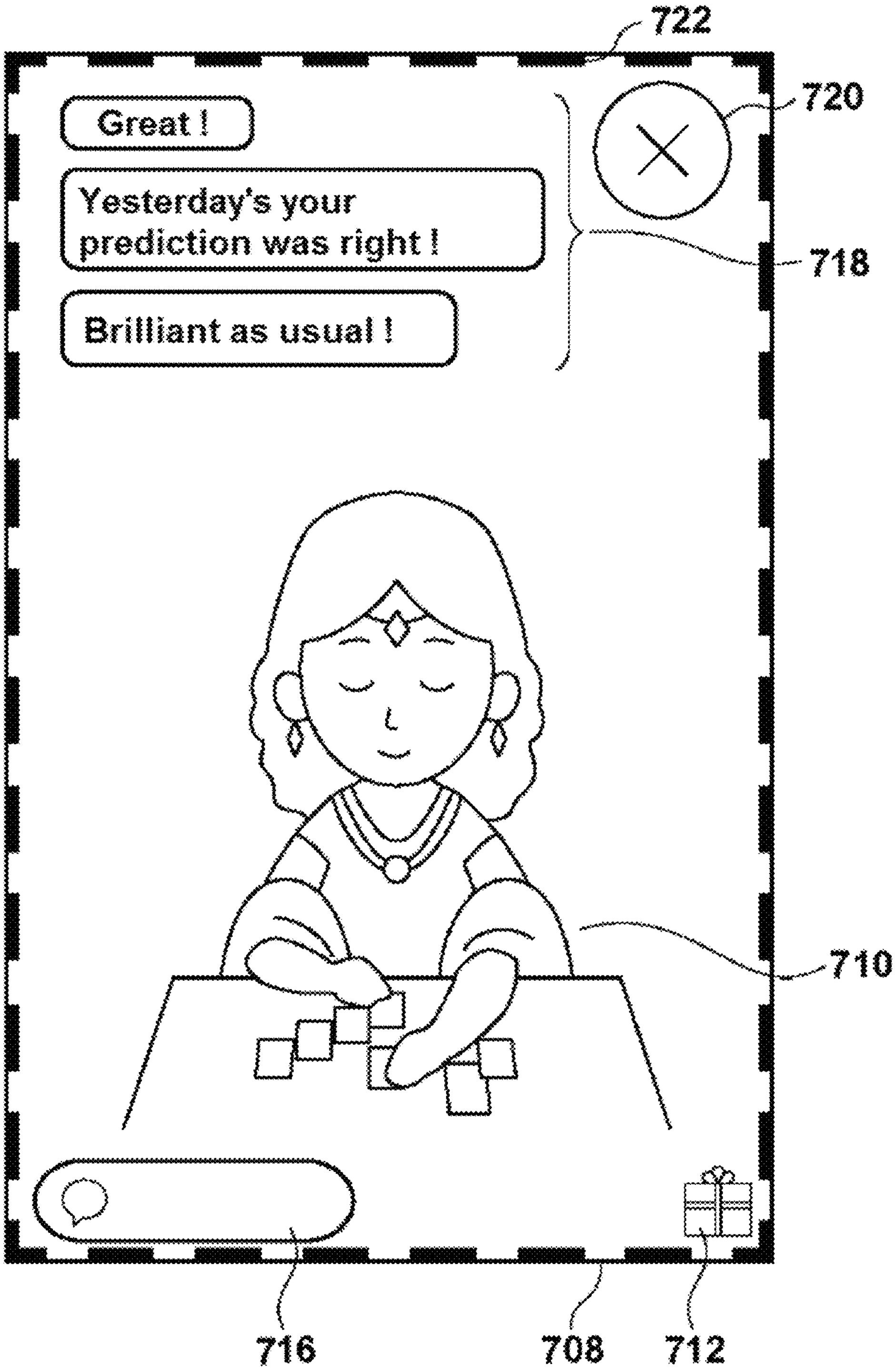
FIG. 15 is an exemplary screen image of a live streaming room screen displayed in a preview mode on the display of the user terminal.

FIG. 15 is an exemplary screen image of a live streaming room screen 708 displayed in the preview mode on the display of the user terminal in step S908. The live-streaming room screen 708 displays a video generated by the user terminal of the streamer in real time. At the same time, the user terminal outputs the audio obtained by the user terminal of the streamer in real time. The server relays these video and audio. That is, the server obtains the video and audio data from the user terminal of the streamer over the network, and transmits the video and audio data to the user terminal of the viewer over the network. In the preview mode immediately after the viewer selects the thumbnail, the server is configured not to notify the streamer or other viewers of the information on the viewer. For example, the presence or absence of viewers in preview mode does not affect the accompanying information (comments, viewer list, etc.) of the live streaming. Alternatively, the viewers in preview mode may be managed differently on the server than other viewers. For example, the viewers in preview mode may be managed using a list different from the viewer list in which other viewers are registered, and/or the preview mode viewers may be given a flag in the viewer list to indicate that they are in preview mode. In this case, when the streamer requests a viewer list, the server may exclude the viewers with the flag from the list to be provided to the streamer.

The live-streaming room screen 708 includes a video 710 of a streamer obtained by reproducing video data received from the server 10, a gift object 712, a commenting zone 716, a comment display zone 718, a quit viewing button 720, and a preview frame 722. The preview frame 722 indicates that the viewer is watching the live streaming in the preview mode. The preview frame 722 is an object added to distinguish between a normal mode live streaming room screen and a preview mode live streaming room screen, which will be described later. Due to the presence of this preview frame 722, it can be said that the live streaming room screen in the normal mode and the live streaming room screen in the preview mode are displayed in different ways from each other.

In the preview mode, the viewer is not allowed to input information. Thus, even when a tap on the gift object 712 on the live streaming room screen 708 is detected, the user terminal does not provide the gift-related function and displays a room entry inquiry pop-up, which will be described later. Similarly, even when a tap on the commenting zone 716 on the live streaming room screen 708 is detected, the user terminal does not provide the comment input function, and displays the room entry inquiry pop-up, which will be described later. However, when a tap on the viewing quit button 720 is detected, the user terminal stops displaying the live streaming room screen 708.

The user terminal waits for detection of a tap on a place other than the viewing quit button 720 on the preview mode live streaming room screen 708 (S910). Upon detection of the tap (Y of S910), the user terminal displays the room entry inquiry pop-up 724 to ask the viewer whether to enter the room of the live streaming (S912).

Figure 16:
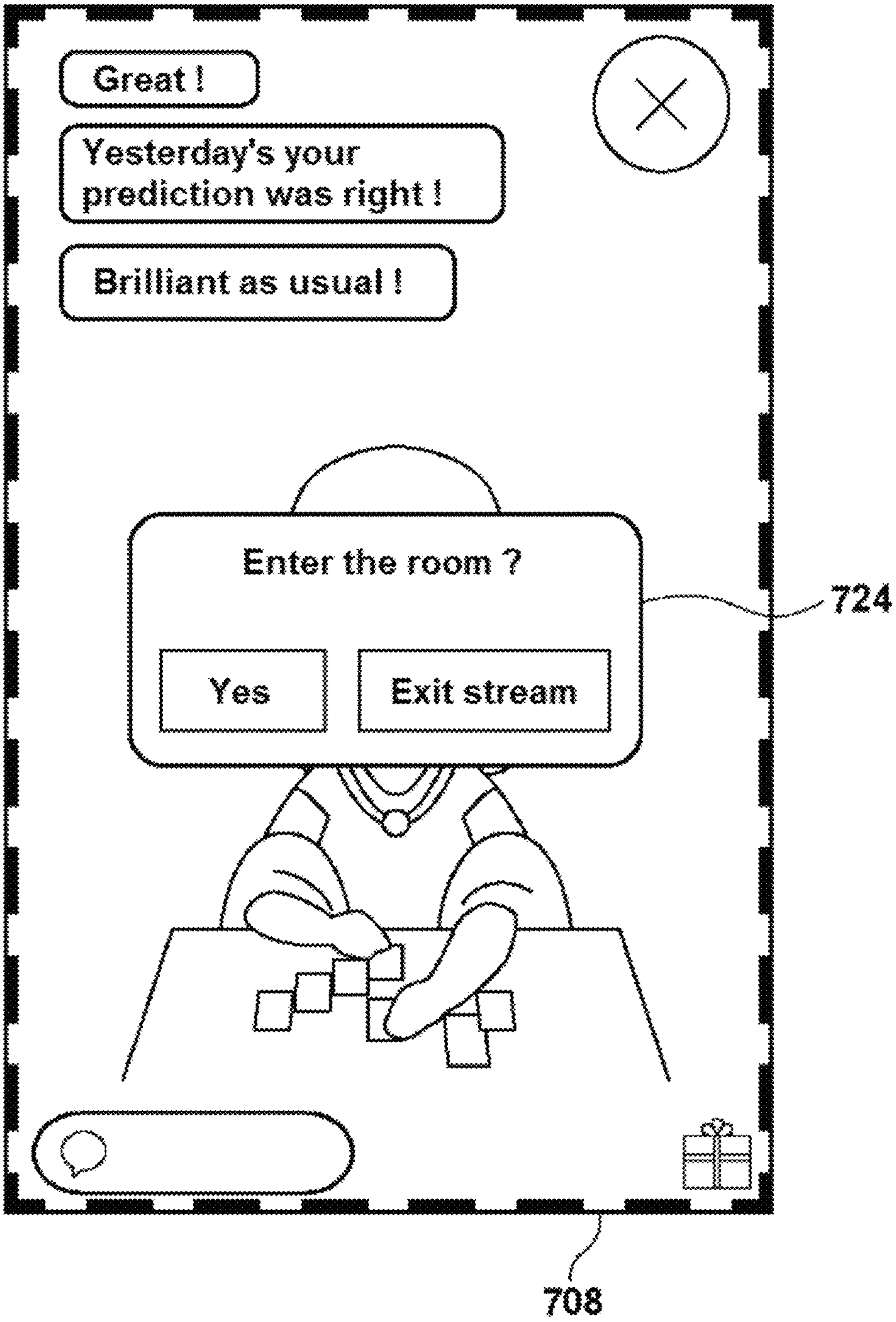
FIG. 16 is an exemplary screen image of a live streaming room screen on which a room entry inquiry pop-up is superimposed.

FIG. 16 is an exemplary screen image of the live streaming room screen 708 on which the room entry inquiry pop-up 724 is superimposed in step S912. The viewer taps to select one from the options of "yes" (that is, enter the room) and "exit streaming" displayed in the room entry inquiry pop-up 724. When the user selects "exit streaming", that is, to leave the room, the user terminal performs a room exit step (S914). Specifically, the user terminal causes transition from the live streaming room screen 708 in FIG. 16 to the live streaming selection screen 700 in FIG. 14 on the display. When the user selects "yes", that is, to enter the room, the user terminal causes transition from the preview mode live streaming room screen to the normal mode live streaming room screen (S916) on the display.

Figure 17:
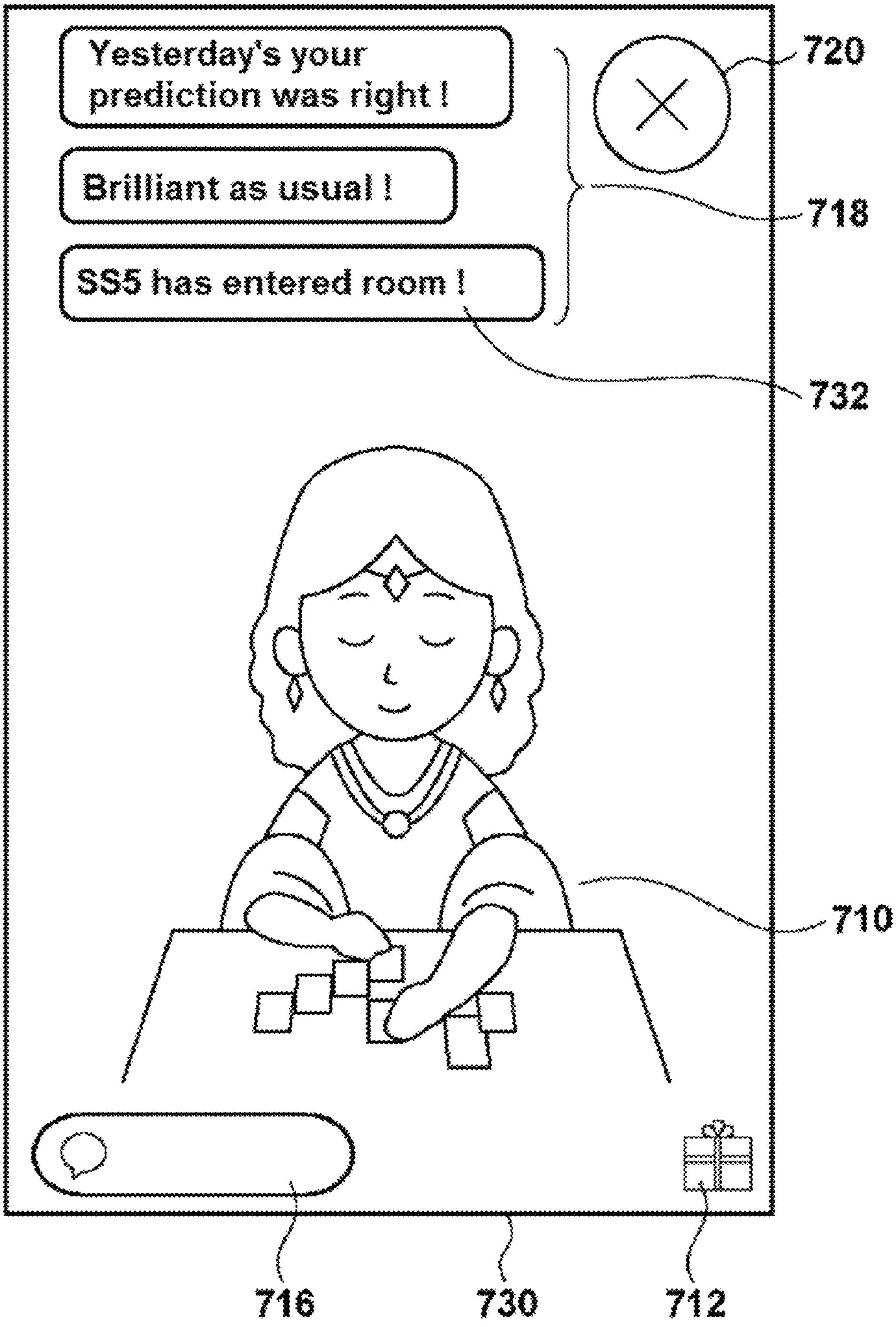
FIG. 17 is an exemplary screen image of a live streaming room screen displayed on the display of the user terminal.

FIG. 17 is an exemplary screen image of a live streaming room screen 730 displayed on the display of the user terminal in step S916. The screen configuration of the normal mode live streaming room screen 730 is the same as the screen configuration of the preview mode live streaming room screen 708 of FIG. 15 except for the presence of the preview frame 722. The normal mode live streaming room screen 630 does not have the preview frame 722.

The comment display zone 718 may include a comment(s) entered by the viewer and a notification(s) from the system. Notifications from the system include information about who gave which gift to the streamer, and a room entry notification indicating information on a viewer who has newly entered the room. In FIG. 17, shown is a room entry notification 732 including the ID of the viewer who selected entry in the room entry inquiry pop-up 724 of FIG. 16. Since this room entry notification 732 is also displayed on the user terminal of the streamer and the user terminals of other viewers, they can know that the viewer has entered the room. The room entry notification 732 is not generated when the viewer taps the thumbnail of the live streaming to view the preview mode live streaming room screen 708. The room entry notification 732 is generated and displayed only after selecting the entry in the room entry inquiry pop-up 724.

The commenting zone 716 accepts comment inputs by the viewer. The user terminal generates a comment input signal that includes the comment entered in the commenting zone 716, and transmits the signal to the server over the network. At the same time, the user terminal updates the comment display zone 718 to display the comment entered in the commenting zone 716.

The gift object 712 enables the viewer to offer a gift to the streamer. When the user terminal detects a tap on the gift object 712, a list of available gifts is superimposed on the live streaming room screen 730.

According to the embodiment, the viewer is able to watch a live streaming in a state where the viewer is invisible to the streamer and other viewers. Thus, the viewer can check the topic currently talked in the live streaming before entering the room, and the viewer can decide whether to enter the room based on the contents of the conversation. As a result, it is possible to reduce the mismatch between the contents of the live streaming and what the viewer wishes to watch.

LIST OF REFETENCE NUMERALS

| | | | |
|---|---|---|---|
| 1 | Live streaming system | 10 | Server |
| 20 | User terminal | 100 | Streaming unit |
| 102 | Video control unit | 104 | Audio control unit |
| 106 | Distribution unit | 108 | UI control unit |
| 200 | Viewing unit | 202 | UI control unit |
| 204 | Rendering unit | 206 | Input transmission unit |
| 30, 30a, 30b | User terminal | 302 | Providing unit |
| 304 | Relay unit | 306 | Invisible handling unit |
| 308 | Stream DB | 310 | User DB |
| 600 | Screen | 602 | Status object |
| 604 | Commenting object | 606 | Gifting object |
| 608 | Message zone | 610 | Screen |
| 612 | Object | 614 | Commenting object |
| 616 | Invisibility object | 618 | Message zone |
| 632 | Frame | 634 | Image |
| 636 | Audio | 638 | Object |
| 652 | Sub-screen | 654 | Viewer image |
| 656 | Viewer ID | 658 | Button |
| 900 | Information processing device | 901 | CPU |
| 903 | ROM | 905 | RAM |
| 907 | Host bus | 909 | Bridge |
| 911 | External bus | 913 | Interface |
| 915 | Input unit | 917 | Output unit |
| 919 | Storage unit | 921 | Drive |
| 923 | Removable recording medium | 925 | Connection port |
| 927 | External connection device | 929 | Communication unit |
| AU1, AU2 | Viewer | LV | Streamer |
| M | Message | Mim | Commenter image |
| Mc | Contents | Mw | Message |
| NW | Network | | |
| S302, S304, S306, S308, S310, S312, S314 | Step | | |
| VD, VD1, VD2 | Video | | |

What is claimed is:

1. A method, comprising:

receiving a selection of a live streaming by a user of a user terminal, the live streaming having a first mode, a second mode and a third mode, the user being invisible in the first mode to a distributor of the live streaming and other users who are viewing the live streaming, the user being visible in the second mode to the distributor of the live streaming and the other users who are viewing the live streaming, and the user being partially visible in the third mode to the distributor of the live streaming and the other users who are viewing the live streaming;

starting, upon receipt of the selection of the live streaming by the user of the user terminal, viewing of the live streaming in the first mode without receiving any input from the user to determine whether to start the live streaming either in the first mode or in the second mode;

accepting a first predetermined user input during viewing of the live streaming in the first mode; and in response to acceptance of the first predetermined user input, enabling viewing of the live streaming in the second mode or the third mode;

wherein an UI object is displayed in the first mode to indicate that the user is watching the live streaming in the first mode; and the UI object further guides the user to watch the live streaming in the second mode, in the third mode or leave the live streaming from the first mode.

2. The method according to claim 1, wherein the first predetermined user input is from the user terminal of the user, or a second user terminal of the distributor or the other users.

3. The method according to claim 1, wherein the information from the user to be disclosed to the distributor of the live streaming and the other users who are viewing the live streaming in the third mode includes partially encrypted or partially hidden information.

4. The method according to claim 1, wherein the information from the user to be disclosed to the distributor of the live streaming and the other users who are viewing the live streaming in the third mode includes video, audio, image or text data corresponding to the user.

5. The method according to claim 1, further comprising:

allowing viewing of the live streaming in the first mode from the user in response to the user of the user terminal having an authority;

the authority is determined according to historical data of the user terminal of the user.

6. The method according to claim 1, wherein:

the other users are further limited to the viewers who follow the user or are followed by the user.

7. The method according to claim 1, further comprising:

setting a time period of viewing of the live streaming in the first mode; wherein enabling viewing of the live streaming in the second mode or the third mode in response to the time period being over.

8. The method according to claim 1, further comprising: allowing viewing of the live streaming in the first mode by a second user of a second user terminal;

setting an invisibility level to the user and the second user respectively according to historical data of the user and the second user; and setting the user to be visible to the second user in response to the invisibility level of the user being lower than the invisibility level of the second user.

9. The method according to claim 1, wherein more features are available in the second mode and the third mode than in the first mode.

10. The method according to claim 1, wherein communication between the user and other users participating in the live streaming is more restricted in the first mode than in the second mode and the third mode.

11. The method according to claim 1, further comprising displaying a message in response to enabling viewing of the live streaming in the second mode or the third mode; wherein the message indicates information on the user that has newly entered the live streaming.

12. The method according to claim 1, further comprising accepting a second predetermined user input during viewing of the live streaming in the first mode; and in response to acceptance of the second predetermined user input, making the user of the user terminal leave the live streaming in the first mode.

13. The method according to claim 1, wherein making the user of the user terminal leave the live streaming in the first mode includes causing the user terminal to be transitioned from the live streaming to the other streaming.

14. A server comprising a processor, wherein the processor is programed to perform:

receiving a selection of a live streaming by a user of a user terminal, the live streaming having a first mode, a second mode and a third mode, the user being invisible in the first mode to a distributor of the live streaming and other users who are viewing the live streaming, the user being visible in the second mode to the distributor of the live streaming and the other users who are viewing the live streaming, and the user being partially visible in the third mode to the distributor of the live streaming and the other users who are viewing the live streaming;

starting, upon receipt of the selection of the live streaming by the user of the user terminal, viewing of the live streaming in the first mode without receiving any input from the user to determine whether to start the live streaming either in the first mode or in the second mode;

accepting a first predetermined user input during viewing of the live streaming in the first mode; and in response to acceptance of the first predetermined user input, enabling viewing of the live streaming in the second mode or the third mode;

wherein an UI object is displayed in the first mode to indicate that the user is watching the live streaming in the first mode; and the UI object further guides the user to watch the live streaming in the second mode, in the third mode or leave the live streaming from the first mode.

15. The server according to claim 14, wherein the information from the user to be disclosed to the distributor of the live streaming and the other users who are viewing the live streaming in the third mode includes partially encrypted or partially hidden information.

16. The server according to claim 14, wherein more features are available in the second mode and the third mode than in the first mode.

17. The server according to claim 14, wherein communication between the user and other users participating in the live streaming is more restricted in the first mode than in the second mode and the third mode.

18. A non-transitory computer-readable medium including program instructions, that when executed by one or more processors, cause the one or more processors to execute:

receiving a selection of a live streaming by a user of a user terminal, the live streaming having a first mode, a second mode and a third mode, the user being invisible in the first mode to a distributor of the live streaming and other users who are viewing the live streaming, the user being visible in the second mode to the distributor of the live streaming and the other users who are viewing the live streaming, and the user being partially visible in the third mode to the distributor of the live streaming and the other users who are viewing the live streaming;

starting, upon receipt of the selection of the live streaming by the user of the user terminal, viewing of the live streaming in the first mode without receiving any input from the user to determine whether to start the live streaming either in the first mode or in the second mode;

accepting a first predetermined user input during viewing of the live streaming in the first mode; and in response to acceptance of the first predetermined user input, enabling viewing of the live streaming in the second mode or the third mode;

wherein an UI object is displayed in the first mode to indicate that the user is watching the live streaming in the first mode; and the UI object further guides the user to watch the live streaming in the second mode, in the third mode or leave the live streaming from the first mode.

* * * * *